(12) United States Patent  
Ryu

(10) Patent No.: US 9,599,149 B2
(45) Date of Patent: Mar. 21, 2017

(54) FLUID FILM HYDRODYNAMIC TILTING PAD SEMI-FLOATING RING JOURNAL BEARING WITH COMPLIANT DAMPERS

(71) Applicant: BorgWarner Inc., Auburn Hills, MI (US)

(72) Inventor: Keun Ryu, Seoul (KR)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/435,931

(22) PCT Filed: Oct. 14, 2013

(86) PCT No.: PCT/US2013/064778
§ 371 (c)(1),
(2) Date: Apr. 15, 2015

(87) PCT Pub. No.: WO2014/066080
PCT Pub. Date: May 1, 2014

(65) Prior Publication Data
US 2015/0267740 A1 Sep. 24, 2015

Related U.S. Application Data

(60) Provisional application No. 61/719,079, filed on Oct. 26, 2012.

(51) Int. Cl.
*F16C 17/03* (2006.01)
*F16C 17/02* (2006.01)
(Continued)

(52) U.S. Cl.
CPC .............. *F16C 17/03* (2013.01); *F01D 25/16* (2013.01); *F16C 17/024* (2013.01);
(Continued)

(58) Field of Classification Search
CPC ........ F16C 17/03; F16C 17/18; F16C 17/024; F16C 2360/24; F16C 27/045;
(Continued)

(56) References Cited

U.S. PATENT DOCUMENTS 3,043,636 A * 7/1962 Macinnes ............. F01D 25/166
384/287
4,465,384 A * 8/1984 Heshmat ............... F16C 17/024
384/106
(Continued)

FOREIGN PATENT DOCUMENTS

EP 2392783 7/2011
JP 06137157 5/1994

*Primary Examiner* — Marcus Charles
(74) *Attorney, Agent, or Firm* — Reising Ethington P.C.

(57) ABSTRACT

A turbocharger 51 is provided with an improved bearing 52, which may be formed as a semi-floating as a semi-floating ring journal bearing which has hydrodynamic tilting pads 53 on the inner diameter thereof and compliant structural dampers 54 on the outer diameter thereof. The compliant structural dampers 54 are installed between an outer bearing surface and an inner surface of a bearing chamber 56. These compliant structural dampers 54 can be formed as metal mesh dampers 71 or bump foil dampers 72 which are effective to dissipate mechanical energy from structural damping and dry-friction.

18 Claims, 7 Drawing Sheets

(51) Int. Cl.
   *F16C 17/18*   (2006.01)
   *F01D 25/16*   (2006.01)
   *F16C 27/02*   (2006.01)
   *F16C 17/10*   (2006.01)

(52) U.S. Cl.
   CPC ............ *F16C 17/035* (2013.01); *F16C 27/02* (2013.01); *F05D 2220/40* (2013.01); *F16C 17/10* (2013.01); *F16C 17/18* (2013.01); *F16C 2360/24* (2013.01)

(58) Field of Classification Search
   CPC   F16F 15/0237; F01D 25/164; F05D 2240/53; F05D 2240/54; Y10T 29/49643
   USPC ......... 384/99, 103, 106, 117, 129, 215, 276, 384/284, 306, 309, 535, 119, 296; 417/407
   See application file for complete search history.

(56) References Cited

U.S. PATENT DOCUMENTS

| | | | | |
|---|---|---|---|---|
| 4,549,821 | A | | 10/1985 | Kawakami |
| 4,767,222 | A | * | 8/1988 | Paletta ................... F16C 27/02 384/106 |
| 4,950,089 | A | * | 8/1990 | Jones ..................... F16C 17/024 384/103 |
| 4,983,050 | A | | 1/1991 | Aida |
| 5,197,807 | A | * | 3/1993 | Kuznar ................. F01D 25/164 277/645 |
| 5,215,384 | A | * | 6/1993 | Maier .................... F16C 27/02 384/117 |
| 5,316,391 | A | * | 5/1994 | Monzel .................... F16F 1/32 384/99 |
| 5,613,781 | A | * | 3/1997 | Kuzdzal ................. F16C 17/03 384/215 |
| 6,017,184 | A | * | 1/2000 | Aguilar ................ F01D 25/168 415/105 |
| 6,065,875 | A | * | 5/2000 | Mitsubori ............. F01D 25/162 384/119 |
| 6,505,837 | B1 | * | 1/2003 | Heshmat ................ F01D 11/02 277/411 |
| 7,066,651 | B2 | * | 6/2006 | Nicholas ................ F16C 27/02 384/99 |
| 7,625,121 | B2 | * | 12/2009 | Pettinato ................ F16C 17/03 384/117 |
| 7,670,056 | B2 | * | 3/2010 | Petitjean ................ F01D 25/16 384/284 |
| 7,753,591 | B2 | * | 7/2010 | Petitjean ................ F01D 25/16 384/397 |
| 8,118,570 | B2 | * | 2/2012 | Meacham ................ F02C 6/12 384/119 |
| 8,182,153 | B2 | * | 5/2012 | Singh .................... F01D 25/164 384/99 |
| 8,459,932 | B2 | * | 6/2013 | Nakano ................. F01D 25/16 415/112 |
| 2009/0110572 | A1 | | 4/2009 | Meacham et al. |
| 2009/0304313 | A1 | * | 12/2009 | Ertas .................... F16C 17/035 384/99 |

* cited by examiner

FLUID FILM HYDRODYNAMIC TILTING PAD SEMI-FLOATING RING JOURNAL BEARING WITH COMPLIANT DAMPERS

CROSS-REFERENCE TO RELATED APPLICATION

This application claims priority to and all the benefits of U.S. Provisional Application No. 61/719,079, filed on Oct. 26, 2012, and entitled "Fluid Film Hydrodynamic Flexure Pivot Tilting Pad Semi Floating Ring Journal Bearing With Compliant Dampers."

FIELD OF THE INVENTION

The invention relates to a turbocharger with an improved shaft bearing and more particularly, to an improved journal bearing which is formed as a semi-floating ring bearing having compliant structural dampers between the bearing and bearing housing.

BACKGROUND OF THE INVENTION

Turbochargers are provided on an engine to deliver air to the engine intake at a greater density than would be possible in a normal aspirated configuration. This allows more fuel to be combusted, thus boosting the engine's horsepower without significantly increasing engine weight.

Generally, turbochargers use the exhaust flow from the engine exhaust manifold, which exhaust flow enters the turbine housing at a turbine inlet, to thereby drive a turbine wheel, which is located in the turbine housing. The turbine wheel provides rotational power to drive the compressor wheel and thereby drive the compressor of the turbocharger. This compressed air is then provided to the engine intake as referenced above.

Referring in more detail to a representative turbocharger 10 shown in the cross-sectional view of FIG. 1, the turbocharger 10 includes a turbine housing or casing 12 having a volute 14 extending circumferentially therein, a compressor housing 16 and a compressor volute 17, and a turbine wheel 18 and a compressor wheel 19 that are rotatably connected together by a shaft 21. The shaft 21 is supported by a bearing system 22 which is supported within a central bearing housing 23 disposed between the turbine housing 12 and the compressor housing 16. The bearing housing 23 defines a bearing chamber 24 which extends axially between the compressor housing 16 and turbine housing 12 to allow the shaft 21 to extend axially therebetwen so that rotation of the turbine wheel 18 drives rotation of the compressor wheel 19 during operation of the turbocharger 10.

The bearing system 22 typically includes a journal bearing 25 positioned within the bearing chamber 24 to provide radial support to the rotating shaft 21.

FIGS. 2 and 3 illustrate one example of a known bearing configuration, which is currently in commercial use. In this configuration, a semi-floating ring bearing 30 is provided which mounts within the bearing chamber 24 so that it is located radially between a radially inward-facing chamber surface 31 of the bearing housing 23 and a radially outward-facing shaft surface 32 of the shaft 21. The bearing 30 includes stop formations 33 on at least one of the bearing ends, wherein a locking pin engages between the bearing housing 23 and formations 33 to prevent rotation of the bearing 30 relative to the bearing housing 23 during shaft rotation. However, this semi-floating ring bearing 30 is able to float or move radially to a small extend during shaft rotation.

To dampen radial movements caused by shaft rotation, a fluid such as oil is supplied to the bearing chamber 24 which is able to flow through the ring bearing 30 to the inside thereof. The bearing 30 includes a cylindrical bearing wall 34 which defines inner and outer cavities 35 and 36 wherein the wall 34 includes ports 37 through which oil may flow between the cavities 35 and 36. The opposite ends of the bearing 30 include squeeze film dampers 39 defined by outer bearing surfaces 40 that respectively form an outer fluid film 41 of oil. Additionally, the bearing ends include journal bearings 42 defined by inner bearing surfaces 43 that respectively define an inner fluid film 44 of oil. The outer and inner films 41 and 44 form between the outer and inner bearing surfaces 40 and 43 and the opposing shaft surface 32 and chamber surface 31.

This semi-floating ring bearing 30 is known and in commercial use although such bearing 30 also exhibits some characteristics which may be undesirable. For example, semi-floating ring bearings are prone to exhibit one or more subsynchronous motions having a large amplitude which may arise during shaft rotation over an extended range of operating speeds. Further, the inner bearing films may have large cross-coupled stiffness coefficients which can be a typical driver of instability in a rotor-bearing system. Still further, the damping coefficients of the squeeze film dampers are non-linear with the rotor's dynamic response amplitude, are sensitive to oil supply pressure and temperature and are difficult to predict.

In other types of bearings, tilting pad bearings are commonly used in high performance turbomachinery because they have proven stability characteristics. For example, tilting pad bearings do not generate cross-coupled stiffnesses.

In another example, tilting pad bearings provide the same rotordynamic advantages as the tilting pad bearings. Typically, tilting pad bearings are machined as one piece and eliminate pivot wear, contacts stresses, and pad flutter, and minimize the stack-up of manufacturing tolerances. Pads machined integrally with the bearing offer a compact bearing unit which is easy to install.

Despite the foregoing, disadvantages can still exist with known bearing configurations.

The invention relates to an improved bearing for a turbocharger wherein the inventive bearing preferably is a semi-floating ring bearing, which has compliant structural dampers installed between the outer bearing surface and the inner surface of the bearing chamber so as to eliminate squeeze film dampers. These compliant structural dampers can be formed as metal mesh dampers or bump foil dampers which are effective to dissipate mechanical energy from structural damping and dry-friction.

In one embodiment, metal mesh dampers provide distinctive advantages over squeeze film dampers. For example, such metal mesh dampers are not dependent upon lubricant supply like squeeze film dampers such that there is no requirement for oil and no stiffness and damping variations due to the operational characteristics of the supplied oil. The metal mesh dampers also provide stiffness as well as damping, and can handle extreme temperature differences since there is no variation in stiffness and damping due to temperature changes. Still further, the stiffness and damping coefficients can be selectively varied and controlled by changing the metal mesh material, geometry and mesh density depending upon the operating conditions encountered in the bearing chamber during shaft rotation. The metal mesh dampers also provide maximum damping at lower frequency ranges, wherein rotordynamic instability frequencies are significantly lower than the rotor synchronous frequency or shaft rotational frequency.

In another embodiment, the compliant structural damper may be a bump foil damper which also provides structural stiffness and frictional damping. This thereby lowers transmitted forces and increases bearing/machinery life.

As described further herein, the inventive bearing provides advantages over known bearing configurations.

Other objects and purposes of the invention, and variations thereof, will be apparent upon reading the following specification and inspecting the accompanying drawings.

Figure 1:
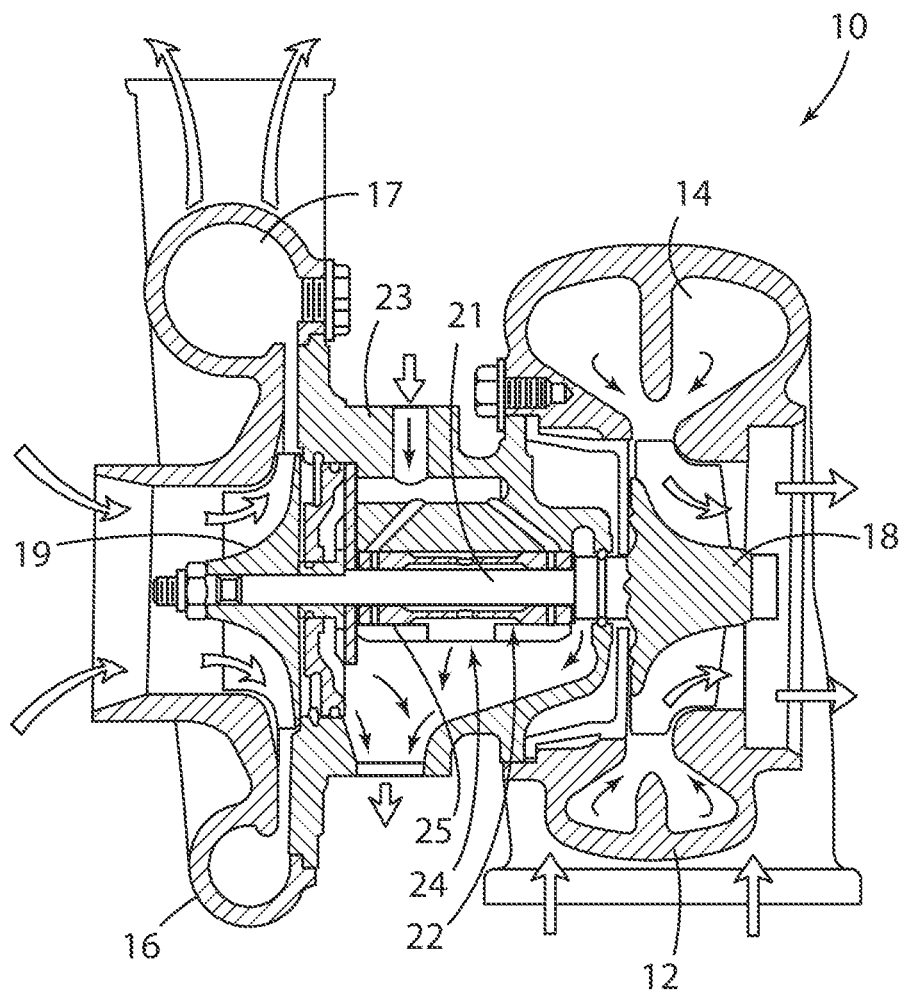
FIG. 1 is a cross-sectional view of a representative turbocharger.
Figure 2:
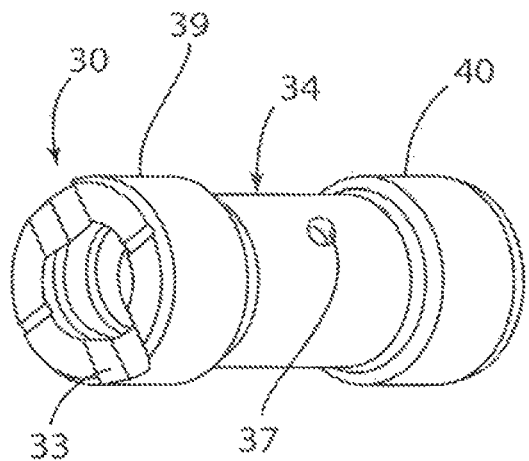
FIG. 2 is an oblique view of a semi-floating ring bearing.
Figure 3:
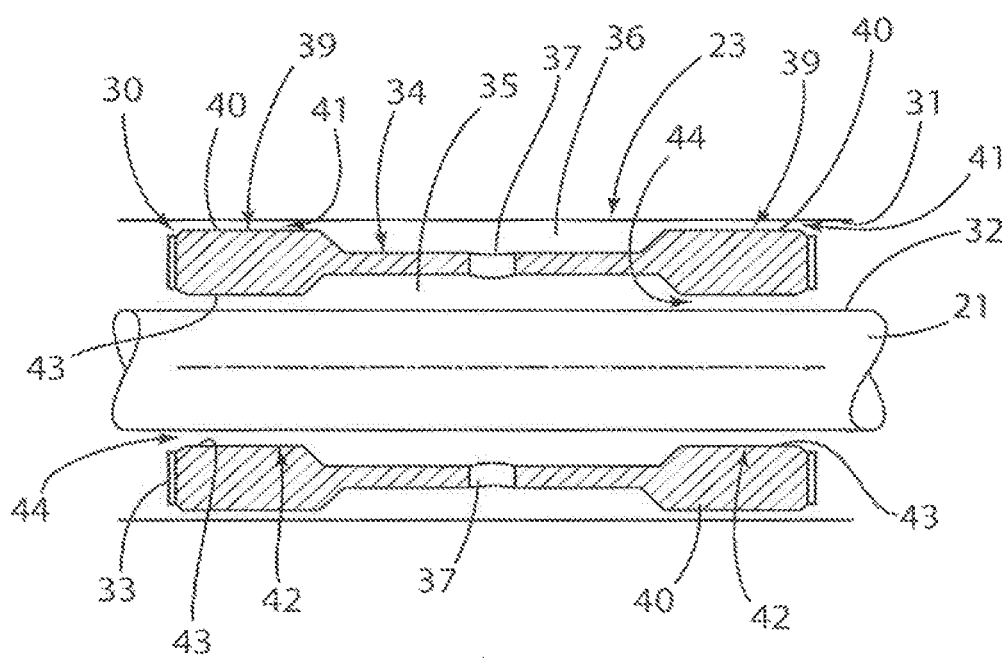
FIG. 3 is a cross-sectional side view of the semi-floating ring bearing of FIG. 2 installed within a bearing housing.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 4:
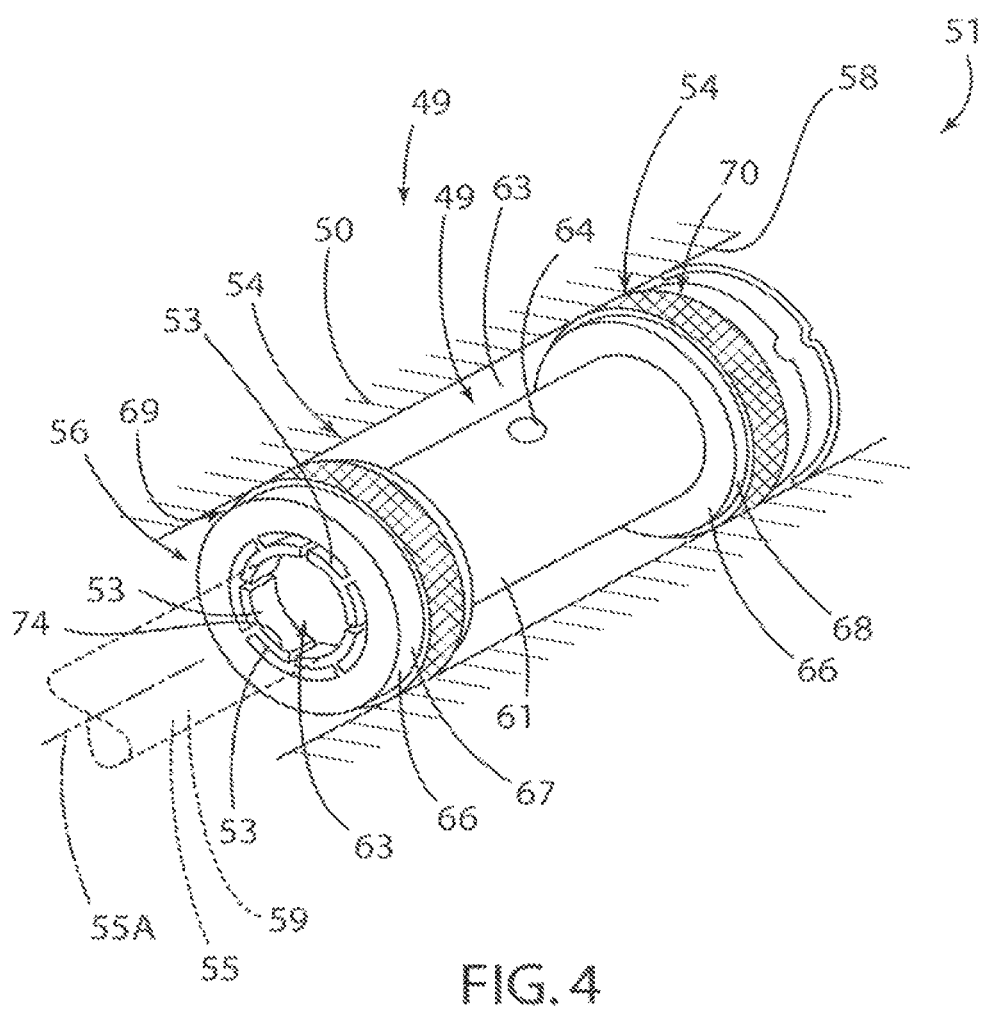
FIG. 4 is an isometric view of the invention which comprises a semi-floating ring journal bearing which has hydrodynamic tilting pads and compliant structural dampers.

Referring to FIG. 4, a bearing unit or assembly 49 is provided in a bearing housing 50 of a turbocharger 51 is shown with an inventive bearing 52 disposed therein. The bearing unit 49 comprises a bearing 52 preferably formed as a semi-floating ring journal bearing which has hydrodynamic tilting pads 53 on the inner diameter thereof and compliant structural dampers 54 on the outer diameter thereof. The bearing 52 preferably is formed as a single monolithic piece with the compliant structural dampers 54 assembled thereto to form the bearing unit 49. As described herein, this inventive bearing unit 49 provides advantages as will become apparent from the following discussion.

In accord with the above description, the turbocharger 51 may be any suitable turbocharger like that described above relative to FIG. 1. In comparison to the basic turbocharger components of FIG. 1, the turbocharger 51 would include a turbine wheel 18 and a compressor wheel 19 that are rotatably connected by a shaft 21. In FIG. 4, a comparable shaft is designated by reference numeral 55 and diagrammatically shown in phantom outline.

In the inventive system of FIG. 4, the shaft 55 is supported by the bearing 52 which in turn is supported within the central bearing housing 50. The bearing housing 50 defines a bearing chamber 56 extending axially therethrough. Similar to FIG. 1, the bearing chamber 56 would open into the compressor housing and turbine housing so that rotation of the turbine wheel rotates the shaft 55 in a conventional manner to drive the compressor wheel, which is connected to the opposite end of the shaft.

The bearing 52 is positioned within the bearing chamber 56 to provide radial support to the rotating shaft 55.

The bearing housing 50 defines a bearing chamber surface 58, which faces radially inwardly toward and surrounds the shaft 55, while the shaft 55 defines an opposing shaft surface 59 which faces radially outwardly in opposing relation to the chamber surface 58. The semi-floating ring bearing 52 slides axially into the bearing chamber 56 so that it is located radially between the bearing chamber surface 58 and the opposing shaft surface 59.

At least one end of the bearing 52 includes an anti-rotation clip 61 which engages radially between the bearing housing 50 and the bearing 52 to prevent rotation of the bearing 52 relative to the bearing housing 50 during shaft rotation. As such, the bearing 52 is circumferentially stationary during shaft rotation, although this semi-floating ring bearing 52 is able to float or move radially to a small extend during shaft rotation.

To dampen radial movements caused by shaft rotation, a lubricating fluid such as oil is supplied to the bearing chamber 56 through appropriate supply ports, wherein the oil is able to flow into the radial spaces defined between the bearing 52 and chamber surface 58 on the outside and between the bearing 52 and shaft surface 59 on the inside.

More particularly, the bearing 52 includes a cylindrical bearing wall 61 which defines inner and outer cavities 62 and 63. The wall 61 includes ports 64 through which oil may flow from the outer cavity 63 to the inner cavity 62.

The opposite ends of the bearing 52 include annular bearing flanges 66 which define outer bearing surfaces 67 and 68 which face toward the chamber surface 58. The outer bearing surfaces 67 and 68 are spaced inwardly from the chamber surface 58 a small radial extent to define radial spaces 69 and 70. As will be described further herein, each of the radial spaces 69 and 70 is provided with a compliant structural damper 54.

These compliant structural dampers 54 are effective to dissipate mechanical energy from structural damping and dry-friction and eliminate the use of squeeze film dampers in the radial spaces between a bearing and bearing housing. Preferably, the compliant structural dampers 54 can be formed as metal mesh dampers 71 (FIG. 5) or bump foil dampers 72 (FIG. 6) as will be described in further detail hereinafter.

Continuing with FIG. 4, the inside diameter of the bearing 52 includes hydrodynamic tilting pads 53 which are spaced circumferentially next to each other in surrounding relation to the shaft surface 59. These pads 53 hydrodynamically create a fluid film in the radial space between each interior pad face 74 and the opposing shaft surface 59 during relative movement of the shaft surface 59 which occurs during shaft rotation. In particular, oil is supplied to these opposed surfaces through the oil port 64 wherein the oil forms a fluid film which prevents radial contact between the pad surfaces 74 and shaft 55. The provision of tilting pads 53 in a bearing of this type is known and a further discussion thereof is not required.

Figure 5:
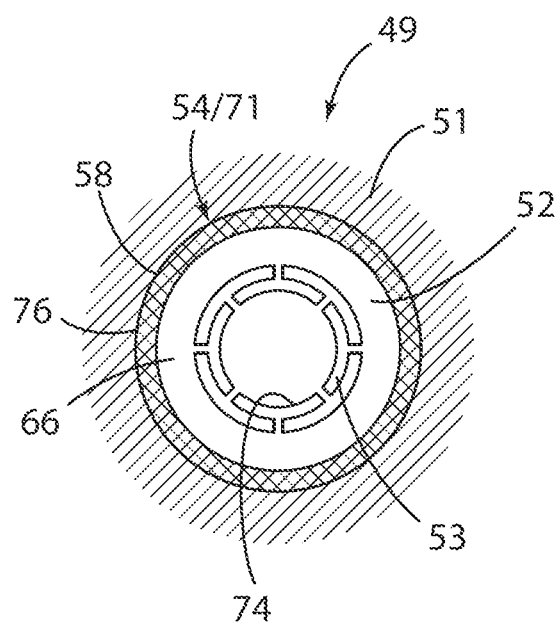
FIG. 5 is an end view of a first embodiment of the inventive bearing which includes metal mesh dampers and is installed within the bearing housing.
Figure 6:
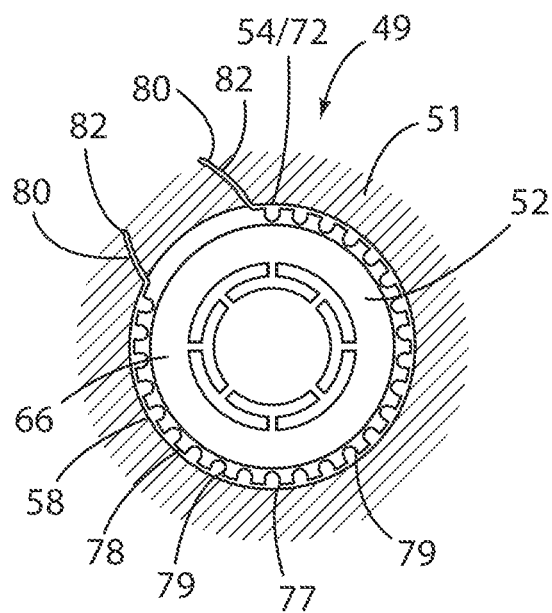
FIG. 6 is an end view of a second embodiment of the inventive bearing which includes bump foils.

As noted above, the compliant structural dampers 54 can be formed as metal mesh dampers 71 (FIG. 5) or bump foil dampers 72 (FIG. 6). Referring to FIG. 5, the compliant structural damper 54 is also designated by reference numeral 71 to indicate it is formed as a metal mesh damper. A metal mesh damper 71 is located on each of the opposite ends of the bearing 52 so as to project radially outwardly from annular bearing flanges 66. The metal mesh dampers 71 project radially outwardly from the bearing 52 toward the opposing chamber surface 58, wherein each of the dampers 71 has an outer radial surface 76 which circumferentially surrounds the bearing 52 and contacts the chamber surface 58. Essentially, the metal mesh dampers span or bridge the radial spaces 69 and 70 (FIG. 4).

In operation, the metal mesh dampers 71 provide distinctive advantages over squeeze film dampers. For example, such metal mesh dampers 71 are not dependent upon lubricant supply like squeeze film dampers such that there is no requirement for oil in the region of dampers 71 located in the radial spaces 69 and 70. As such, there are no stiffness and damping variations due to the characteristics of the supplied oil such as the temperature thereof Preferably, the metal mesh damper 71 is made of copper, steel or a shape memory alloy. The specific mounting of the dampers 71 to the bearing flanges 66 will be discussed in greater detail relative to FIGS. 7 and 8.

The metal mesh dampers 71 provide stiffness as well as damping, and are effective through substantial temperature ranges since there is no variation in stiffness and damping due to temperature changes occurring during turbocharger operation. Still further, the stiffness and damping coefficients of the dampers 71 can be selectively varied and controlled by changing the metal mesh material, geometry and mesh density depending upon the operating conditions encountered in the bearing chamber 56 during rotation of the shaft 55. The metal mesh dampers 71 also provide maximum damping at lower frequency ranges, wherein rotordynamic instability frequencies are significantly lower than the rotor synchronous frequency or shaft rotational frequency.

With this structure, the bearing 52 preferably is formed as a semi-floating ring bearing having the tilting pads 53 which provide hydrodynamic fluid support to maintain separation between the bearing 52 on the inside and the opposing shaft surface 59. The metal mesh dampers 71 serve to then support the bearing 52 on the outside diameter thereof wherein said dampers 71 allow semi-floating movement of the bearing 52 within the bearing chamber 56.

The compliant structural dampers 54 also may be formed as a bump foil damper 72 as seen in FIG. 6. FIG. 6 is an end view of a second embodiment of bearing 52 which includes a generally circular bump foil 77 extending about each of the bearing flanges 66. The bump foil 77 also provides structural stiffness as well as frictional damping. This thereby lowers transmitted forces and increases bearing/machinery life. A bump foil 77 is located on each of the opposite ends of the bearing 52 and serves as a compliant damper 54. As such, each bump foil 77 projects radially outwardly from each of the annular bearing flanges 66. The bump foils 77 project radially outwardly from the bearing 52 toward the opposing chamber surface 58, wherein each of the bump foils 77 has arcuate sections 78 which circumferentially surround the bearing 52 and contact the housing surface 58. The arcuate sections 78 are joined by flexing, bump sections 79. Essentially, the bump foils 77 span or bridge the radial spaces 69 and 70 (FIG. 4).

In the exemplary embodiment shown in FIG. 6, thin slots 80 are provided in the bearing housing surface 58 which slots 80 are angled away from each other and open radially at an angle toward the bump foil 77. The opposite ends of the bump foil 77 includes flanges 82 which insert into the respective slots 80 for the retaining the bump foils 77 on the bearing housing 50. Alternatively, the slots 80 could be provided in the bearing 52 itself with the bump foils 77 carried on the bearing 52. The bump foil dampers 72 can have a variety of configurations such as single bump foils, double-layer bump foils, or circumferentially and axially split bump foils.

As can be seen, the metal mesh dampers 71 and bump foil dampers 72 are two examples of compliant structural dampers 54 which form part of the inventive bearing 52. As described herein relative to FIGS. 7 and 8, the bearing 52 may use alternate configurations for mounting the compliant dampers 54 to the bearing flanges 66.

Figure 7:
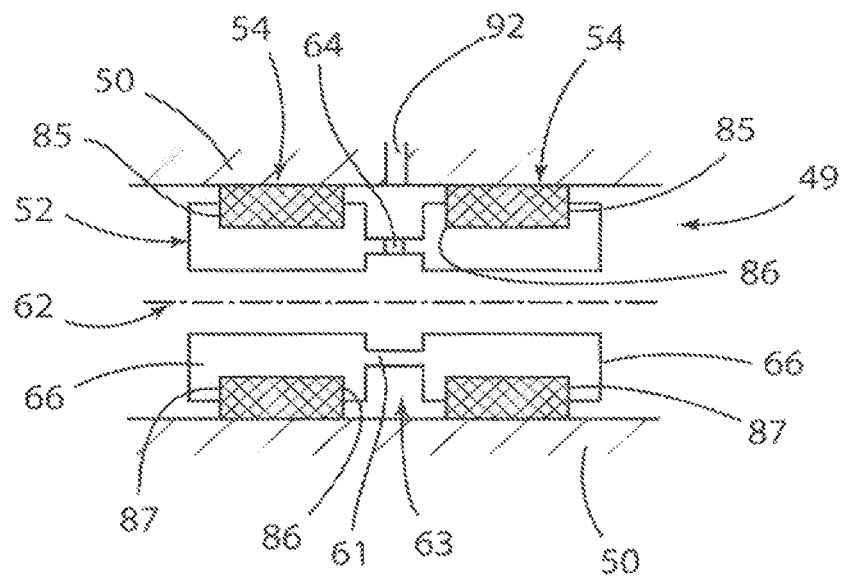
FIG. 7 is a cross-sectional side view showing a first configuration of a bearing.

In one example, FIG. 7 shows a cross-sectional side view of the bearing 52 wherein the annular flanges 66 are each formed with circumferential mounting pockets or channels 85 which each receive a respective one of the dampers 54. These pockets 85 open radially outwardly about the circumference of the bearing flanges 66 but are axially closed on their inboard and outboard ends by side faces 86 and 87. As such, the dampers 54 project radially into contact with the housing surface 58 while the pocket side faces 86 and 87 confine the dampers 54 axially to prevent movement along the shaft axis. For this embodiment, the bump foil 72 may be used as described above.

Figure 9:
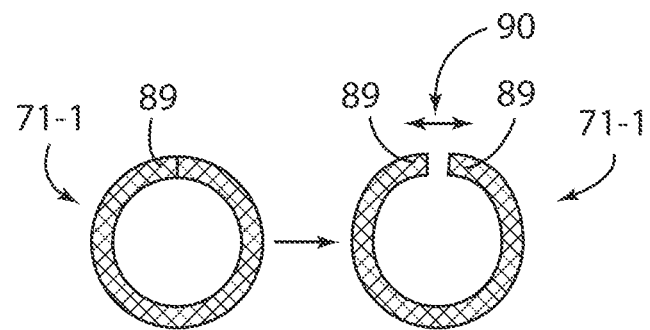
FIG. 9 is an end view of a first configuration of a metal mesh damper.

Alternatively, the metal mesh damper 71 may have several configurations. FIG. 9 is an end view of a first configuration of the metal mesh damper 71-1 which is shown with a clip-ring shape that has separable ends 89. Normally, the clip-ring metal mesh damper 71-1 is in a closed condition as seen in the left side of FIG. 9. The damper 71-1, however, is formed of a resiliently flexible material wherein the damper 71-1 can be flexed so that the ends 89 can be separated to form gap 90 as seen on the right side of FIG. 9. This gap 90 allows the clip-ring damper 71-1 to be slipped over the end of the bearing flange 66 and then fitted into the pocket 85 wherein the resiliency of the damper material restores the clip-ring damper 71-1 to the closed condition seen on the left side of FIG. 9 after assembly.

Figure 10:
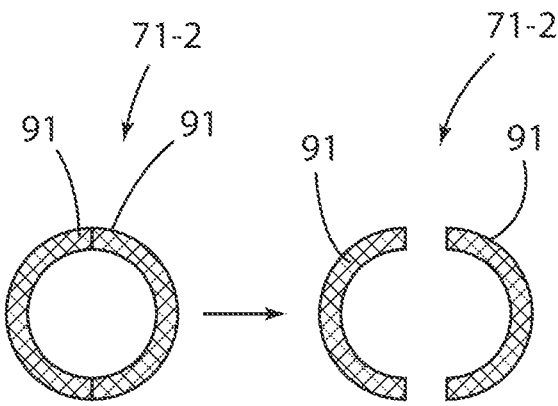
FIG. 10 is an end view of a second configuration of a metal mesh damper.

FIG. 10 is an end view of a second configuration of a metal mesh damper 71-2 which is formed with a half-ring or split ring design. This half-ring damper 71-2 is formed of two damper sections 91 which are separable as seen on the right side of FIG. 10. In this condition, the damper sections 91 are fitted into a respective pocket 85 and then pressed together to the closed configuration seen on the left side of FIG. 10.

As such, the damper designs 71-1 and 71-2 in FIGS. 9 and 10 are readily mounted to the bearing flanges 66 even though the axial ends of the pockets 85 are closed by the side faces 86 and 87.

FIG. 7 also shows additional structure for the supplying of oil to the bearing chamber 56. In this regard, the bearing housing 50 includes an oil supply port or hole 92 which opens through the housing surface 58 and feeds oil into the region of the outer cavity 63 surrounding the bearing wall 61. The oil then passes through the ports 64 into the inner cavity 62 so that the oil is available to form the fluid films by the pads 53 described above.

Figure 8:
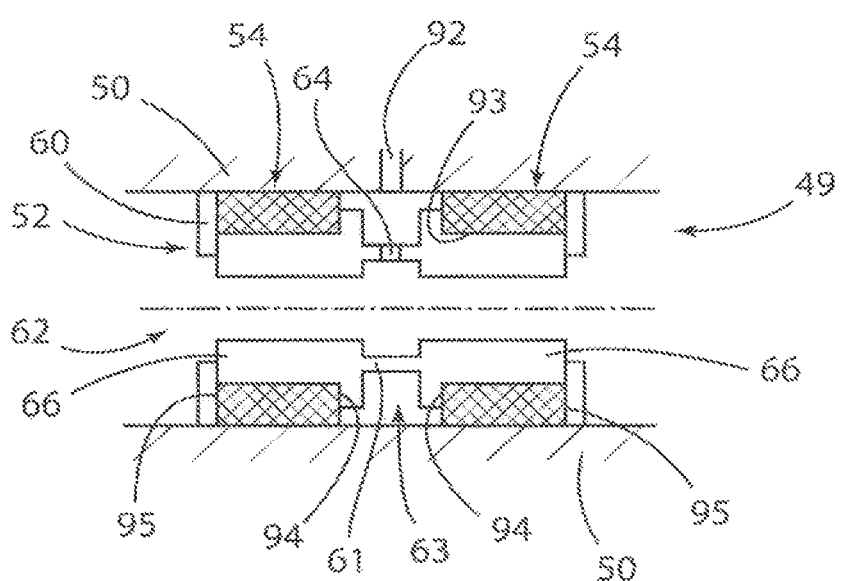
FIG. 8 is a cross-sectional side view showing a second configuration of a bearing.
Figure 11:
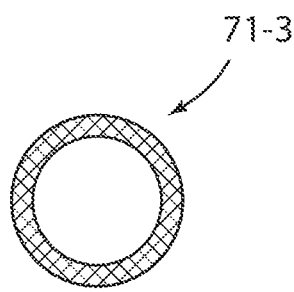
FIG. 11 is an end view of a third configuration of a metal mesh damper.

In an alternate bearing configuration shown in FIG. 8, the bearing flanges 66 can be provided with open-sided pockets 93 which are each defined by an inboard closed side face 94 and an outboard open side 95. The pockets 93 can receive any of the metal mesh dampers 71 or bump foils 72 described above. Further, an additional full-ring damper 71-3 is shown in FIG. 11 which is unbroken circumferentially and is able to be slid axially into the respective pocket 93 through the open side 95. The damper 71-3 then is held in position axially by an anti-rotation clip 61, wherein clips 61 are provided on each of the opposite bearing ends.

Here again in FIG. 8, the bearing housing 50 includes an oil supply port or hole 92 which opens through the housing surface 58 and feeds oil into the region of the outer cavity 63 surrounding the bearing wall 61. The oil then passes through the ports 64 into the inner cavity 62 so that the oil is available to form the fluid films by the pads 53 described above.

For descriptive purposes, it will be understood that reference numeral 71 can apply to any of the dampers 71-1, 71-2 or 71-3 where appropriate.

In another alternate embodiment for the bearing unit 49, the bearing 52 may be provided with a plurality of compliant structural dampers 54 on each bearing flange 66. More particularly, the annular flanges 66 may each be formed with pairs of circumferential mounting pockets or channels 98 and 99 which each receive a respective one of the dampers 54. These pockets 98 and 99 open radially outwardly about the circumference of the bearing flanges 66 but are axially closed on their inboard and outboard ends by side faces like side faces 86 and 87 described above. As such, the dampers 54 project radially into contact with the housing surface 58 while the pocket side faces confine the dampers 54 axially to prevent movement along the shaft axis. For this embodiment, the bump foil 72 may be used as described above, or else the metal mesh dampers 71-1 and 71-2.

Figure 12:
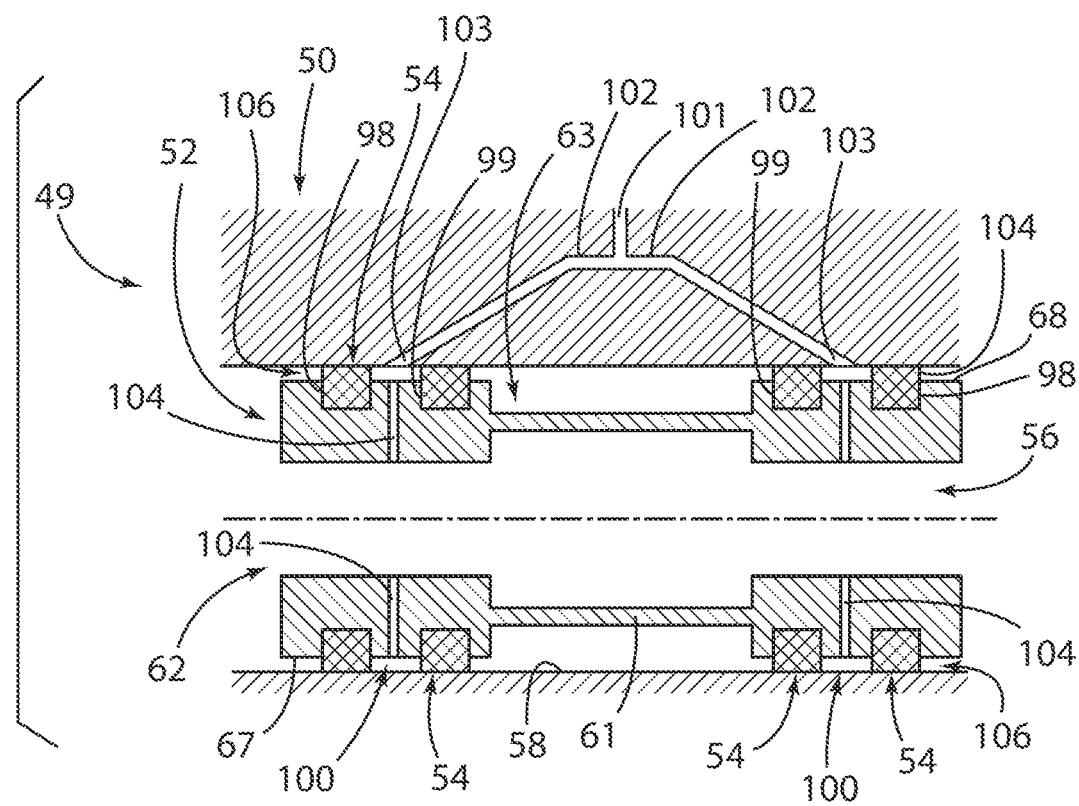
FIG. 12 is a side view of a further embodiment of the invention.

The pairs of pockets 98 and 99 are axially spaced apart to each define an annular cavity 100 configured to receive oil therein. FIG. 12 shows additional structure for the supplying of oil to the bearing chamber 56 and specifically the annular cavities 100. In this regard, the bearing housing 50 includes a feed passage 101 which splits into passages 102. The passages 102 define respective oil supply ports or holes 103 which open through the housing surface 58 and feed oil into the region of the cavities 100 surrounding the bearing flanges 66. The oil then passes through radial ports 104 into the inner cavity 62 so that the oil is fed to the pads 53 described above to thereby form fluid films by the pad faces 74 seen in FIG. 13.

While two axially closed pockets 98 and 99 are shown, it will be understood that the outboard pockets 98 could be open sided like the pockets 93 (FIG. 8) wherein the outboard dampers 54 would be held in place by the additional inclusion of clips 61 (FIG. 8).

Figure 13:
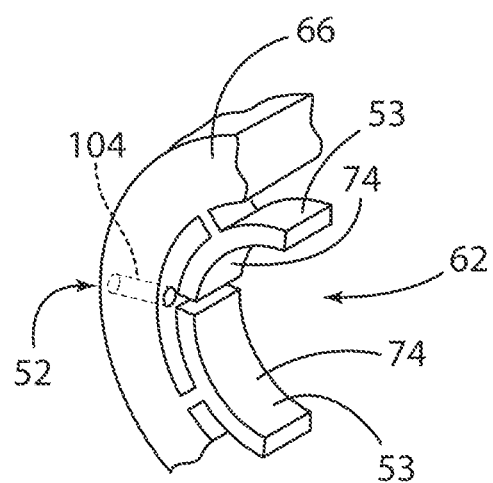
FIG. 13 is a partial oblique view showing the tiling pads of FIG. 12.

The configuration of FIGS. 12 and 13 can be more effective when there is large conical shaft motion, and this configuration is able to reduce oil leakage along the outer gaps 106 formed between the outer bearing surfaces 67 and 68 and the inner housing surface 58.

As described above, this inventive bearing 52 provides advantages over known bearing configurations.

Although particular preferred embodiments of the invention have been disclosed in detail for illustrative purposes, it will be recognized that variations or modifications of the disclosed apparatus, including the rearrangement of parts, lie within the scope of the present invention.

What is claimed:

1. A semi-floating ring bearing assembly for a turbocharger shaft, comprising:
   a semi-floating ring bearing which has an inner diameter and an outer diameter, wherein said bearing includes hydrodynamic tilting pads on said inner diameter thereof and compliant structural dampers on said outer diameter thereof, said compliant structural dampers projecting radially outwardly from said bearing for contact with an opposing bearing chamber surface of a bearing housing;
   wherein said bearing includes annular flanges which are each formed with circumferential mounting pockets, each of said pockets receiving a respective one of said compliant structural dampers.

2. The bearing assembly according to claim 1, wherein said compliant structural dampers can be formed as metal mesh dampers or bump foil dampers.

3. The bearing assembly according to claim 1, wherein opposite ends of said bearing include the annular bearing flanges, wherein the annular bearing flanges define outer bearing surfaces which face toward a bearing chamber surface, said outer bearing surfaces being spaced inwardly from a bearing chamber surface to define radial spaces, wherein said compliant structural dampers project outwardly of said outer bearing surfaces so as to span said radial spaces.

4. The bearing assembly according to claim 1, wherein said pockets open radially outwardly and are axially closed on inboard and outboard ends by side faces.

5. The bearing assembly according to claim 4, wherein said compliant structural dampers project radially for contact with a bearing chamber surface while said pocket side faces confine said dampers axially to prevent movement along a shaft axis.

6. The bearing assembly according to claim 5, wherein said compliant structural dampers are metal mesh dampers which are split in one or more locations to define one of a clip-ring shape or a half-ring shape.

7. The bearing assembly according to claim 1, wherein said compliant structural dampers are formed as bump foils extending about each of the bearing flanges.

8. The bearing assembly according to claim 7, wherein each said bump foil projects radially outwardly from each of the annular bearing flanges, and thin slots are provided in one of said bearing and a bearing housing surface wherein opposite ends of said bump foil includes flanges which insert into said respective slots for retaining the bump foils in position.

9. The bearing assembly according to claim 8, wherein said bump foil dampers are one of single bump foils, double-layer bump foils, or circumferentially and axially split bump foils.

10. The bearing assembly according to claim 1, wherein said pockets are open-sided pockets which are each defined by an inboard closed side face and an outboard open side, and said pockets receive one of said compliant structural dampers therein.

11. The bearing assembly according to claim 1, wherein the compliant structural dampers extend around an entire circumference of said bearing.

12. A semi-floating ring bearing assembly for a turbocharger shaft, comprising:
a semi-floating ring bearing which has an inner diameter and an outer diameter, wherein said bearing includes hydrodynamic tilting pads on said inner diameter thereof and compliant structural dampers on said outer diameter thereof, said compliant structural dampers projecting radially outwardly from said bearing for contact with an opposing bearing chamber surface of a bearing housing;
said bearing including annular flanges which are each formed with at least one circumferential mounting pocket which each receives a respective one of said compliant structural dampers therein, said compliant structural dampers projecting outwardly of said annular flanges so as to span radial spaces between said annular flanges and an opposing surface of a bearing housing; and
said compliant structural dampers being formed as metal mesh dampers or bump foil dampers.

13. The bearing assembly according to claim 12, wherein said pockets open radially outwardly and are axially closed on inboard and outboard ends by side faces.

14. The bearing assembly according to claim 12, wherein said pockets are open sided and each defined by an inboard closed side face and an outboard open side, and said pockets receive one of said compliant structural dampers therein.

15. The bearing assembly according to claim 12, wherein said annular flanges are each formed with pairs of circumferential mounting pockets which each receive a respective one of said compliant structural dampers, a fluid being provided between said compliant structural dampers in each said pair.

16. The bearing assembly according to claim 12, wherein the compliant structural dampers extend around an entire circumference of said bearing.

17. A semi-floating ring bearing assembly for a turbocharger shaft, comprising:
a semi-floating ring bearing which has an inner diameter and an outer diameter, wherein said bearing includes hydrodynamic tilting pads on said inner diameter thereof and compliant structural dampers on said outer diameter thereof, said compliant structural dampers projecting radially outwardly from said bearing for contact with an opposing bearing chamber surface of a bearing housing;
wherein said bearing includes annular flanges which are formed with circumferential open-sided pockets which are each defined by an inboard closed side face and an outboard open side, and said pockets receive one of said compliant structural dampers therein.

18. The bearing assembly according to claim 17, wherein the compliant structural dampers extend around an entire circumference of said bearing.

* * * * *